April 20, 1954

L. LEE II 2,675,674

FUEL AND SPEED CONTROL APPARATUS FOR TURBOJET ENGINES

Filed May 9, 1947

INVENTOR.
Leighton Lee II
BY
Lester W Clark
AGENT

INVENTOR.
*Leighton Lee II*
BY
*Lester W Clark*
AGENT

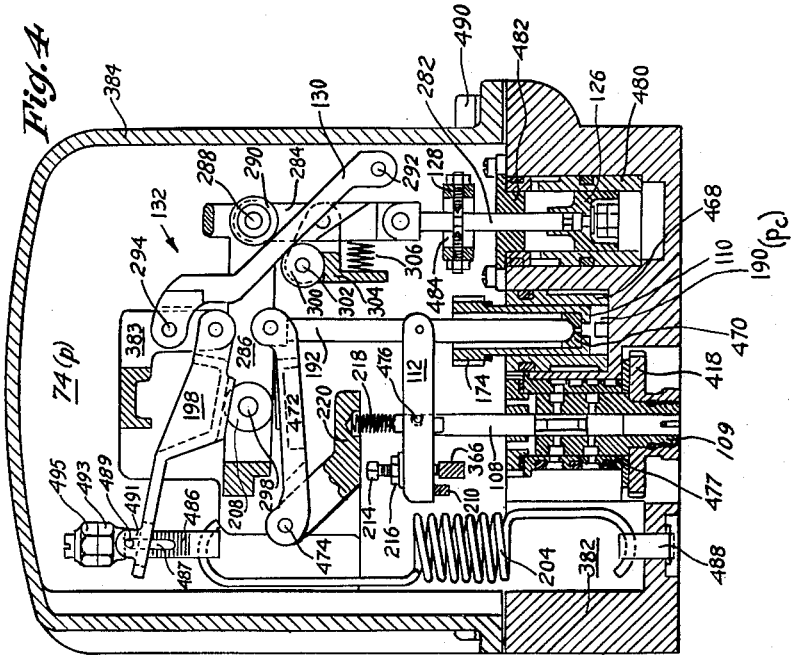

April 20, 1954  L. LEE II  2,675,674
FUEL AND SPEED CONTROL APPARATUS FOR TURBOJET ENGINES
Filed May 9, 1947  5 Sheets-Sheet 4

INVENTOR.
Leighton Lee II.
BY Lester W Clark
AGENT

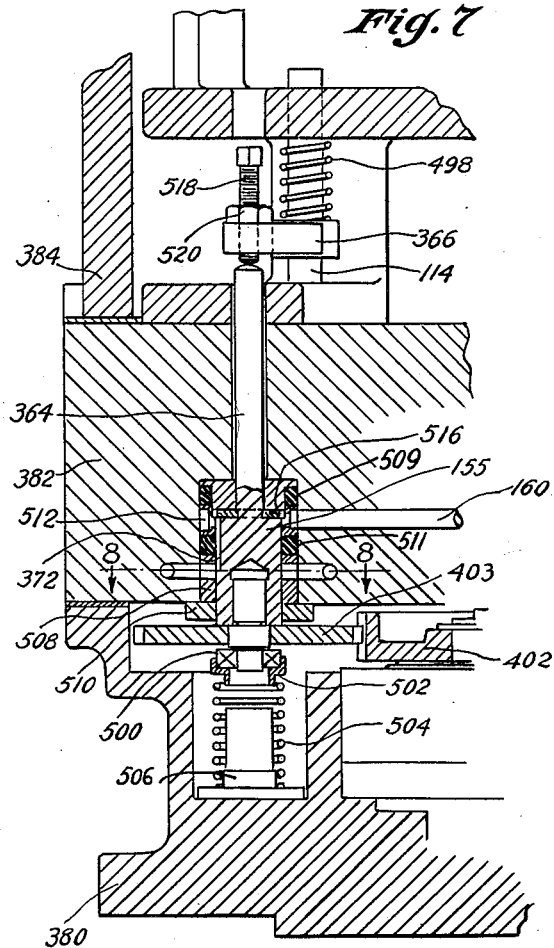
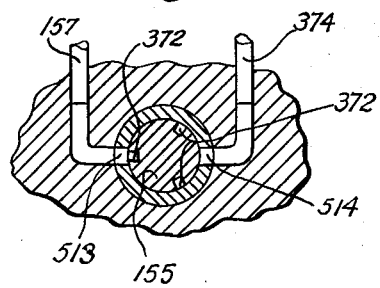

Patented Apr. 20, 1954

2,675,674

UNITED STATES PATENT OFFICE 2,675,674

FUEL AND SPEED CONTROL APPARATUS FOR TURBOJET ENGINES

Leighton Lee II, Rocky Hill, Conn., assignor to Niles-Bement-Pond Company, West Hartford, Conn., a corporation of New Jersey Application May 9, 1947, Serial No. 746,975

32 Claims. (Cl. 60—39.28)

This invention relates to fuel and speed control apparatus for prime movers and especially to such apparatus for internal combustion engines inclusive of gas turbine and jet engines.

My invention is more particularly applicable to internal combustion engines suitable for propeller-propulsion, jet-propulsion, or propeller-and-jet propulsion of aircraft. Such engines usually include an air inlet, an air compressor, one or more combustion chambers, a gas turbine, and a tail pipe for discharging combustion gases to the atmosphere. Associated with the engine is a fuel system including a fuel pump for delivering fuel to the combustion chambers. My invention concerns apparatus to control the engine speed and power by controlling the fuel pump delivery as a function of several variables including engine speed, engine temperature, other engine operating conditions, and manual control.

Owing to structural and metallurgical restrictions, engines of the type referred to may not be safely operated at speeds or temperatures exceeding predetermined limiting values, but for maximum economy of operation, both speed and temperature of the engine must be maintained at or near these values. On the other hand, engine speed is a critical factor in flight performance of aircraft and an engine may not be used at maximum allowable speed in all flight maneuvers, at all flight speeds, or under all flight conditions. In multiple engine installations, it is preferable to operate one or more engines at substantially full speed and power while variations in the total power output are obtained by controlling that of one engine, rather than to operate all engines at correspondingly reduced speed and power. Fuel control apparatus must be provided which enables the operator to vary the engine speed as desired from a minimum value at starting speed and minimum power to the predetermined limiting speed and full power. The control of engine temperature is preferably a substantially automatic function of the fuel control apparatus.

The value of engine speed corresponding to any given value of fuel flow varies as a function of the altitude of flight, flight speed, air density at the engine air inlet, engine torque, fuel quality and a wide variety of other factors. For precise regulation of engine speed or to avoid excessive temperatures, therefore, it is not feasible to rely solely upon automatic regulation of fuel flow as a function of variables which exclude engine speed and temperatures.

Objects of my invention are:

(1) To provide improved fuel and speed control apparatus for an internal combustion engine employing four component coordinated hydraulic systems for regulating the fuel delivery, said systems being respectively responsive to manual control and to pressure, temperature, and speed conditions of the engine;

(2) To provide in such apparatus improved cam and lever mechanism for modifying the operation of the manual system by the pressure responsive system;

(3) To provide improved pressure regulating and pressure responsive control elements which may be used in hydraulic apparatus such as above described;

(4) To provide in the temperature responsive control system in such apparatus improved means for automatically resetting the apparatus to permit higher engine temperatures in a predetermined emergency range of operation than in a corresponding normal range of operation;

(5) To provide in apparatus such as described an improved assembly of component parts of said apparatus including three separable principal castings having all working parts mounted therein or thereon and having a removable dome-shaped cover for permitting ready access to all parts assembled in and on one of said principal castings;

(6) To provide an improved arrangement of external connections to such apparatus including a main drive shaft on the centerline of a fluid pump and a speed governor means for simultaneously operating said pump and said governor means, and a main control shaft having adjacently thereon a pair of cams for operation of the manual and speed control systems;

(7) To provide in such apparatus improved means for controlling acceleration and deceleration of the engine as a function of said pressure responsive system; and (8) To provide improved means responsive to the control shaft for predetermining the engine speed including adjustable means for preselecting a maximum value of speed independently of operation of the control shafts.

Other objects and advantages of my invention will become apparent from a consideration of the appended specification, claims, and drawings, in which:

Fig. 3 is a cross-sectional elevational view of the apparatus shown diagrammatically in Fig. 2, taken on the line 3—3 of Fig. 6, showing the main drive shaft and portions of the speed and pressure responsive control systems;

Fig. 4 is a cross-sectional elevational view of the apparatus of Fig. 3 except for omission of the mounting flange, taken on the line 4—4 of Fig. 6 in which principal elements of the manual and pressure responsive control systems are chiefly shown;

Figure 6:
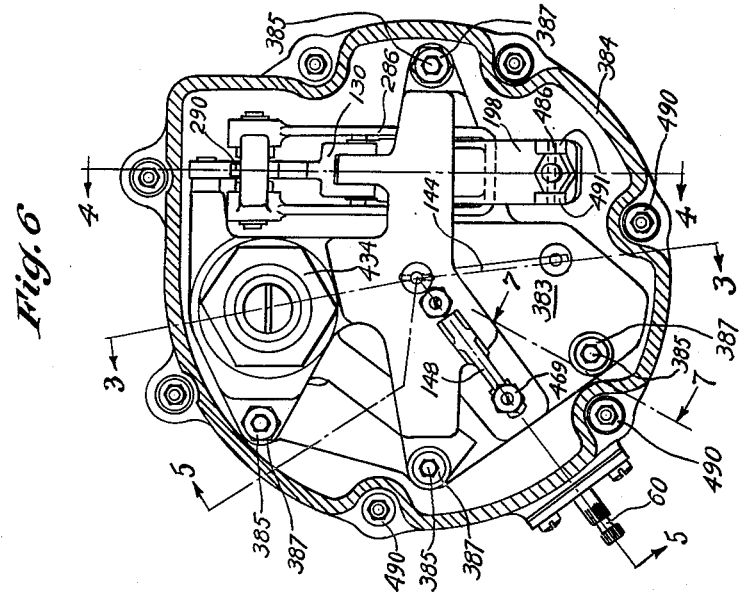
Figure 5:
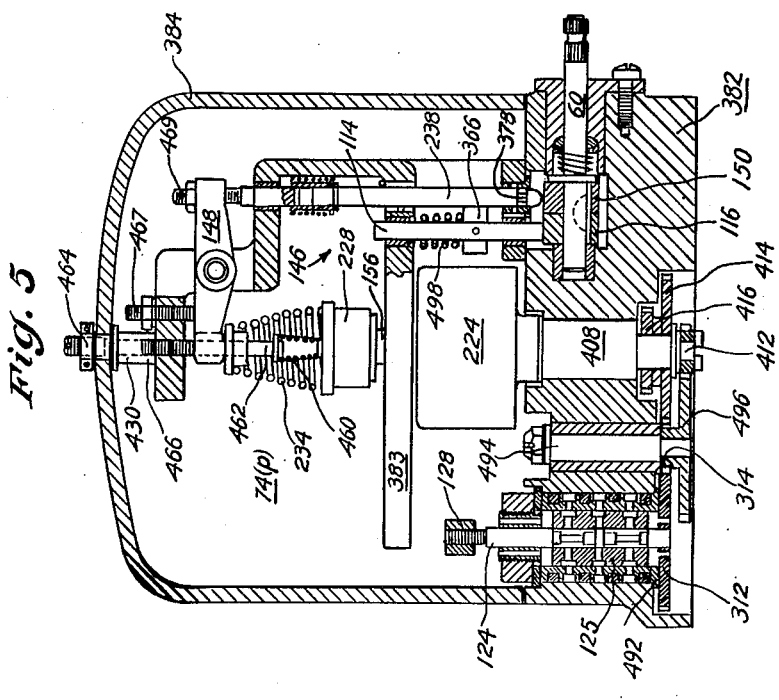
Fig. 5 is a cross-sectional elevational view of the apparatus of Figs. 3 and 4, taken on the line 5—5 of Fig. 6, showing the control shaft and other elements of the apparatus.

Fig. 6 is a cross-sectional plan view of the apparatus of Figs. 3, 4 and 5, taken on the line 6—6 of Fig. 3 on which are indicated section lines 3—3, 4—4, 5—5, and 7—7 for identifying the respective locations of the sections shown in Figs. 3, 4, 5, and 7;

Fig. 7 is a cross-sectional elevational view taken along the line 7—7 of Fig. 6; and Fig. 8 is a fragmentary cross-sectional view taken along the line 8—8 of Fig. 7.

Figure 1:
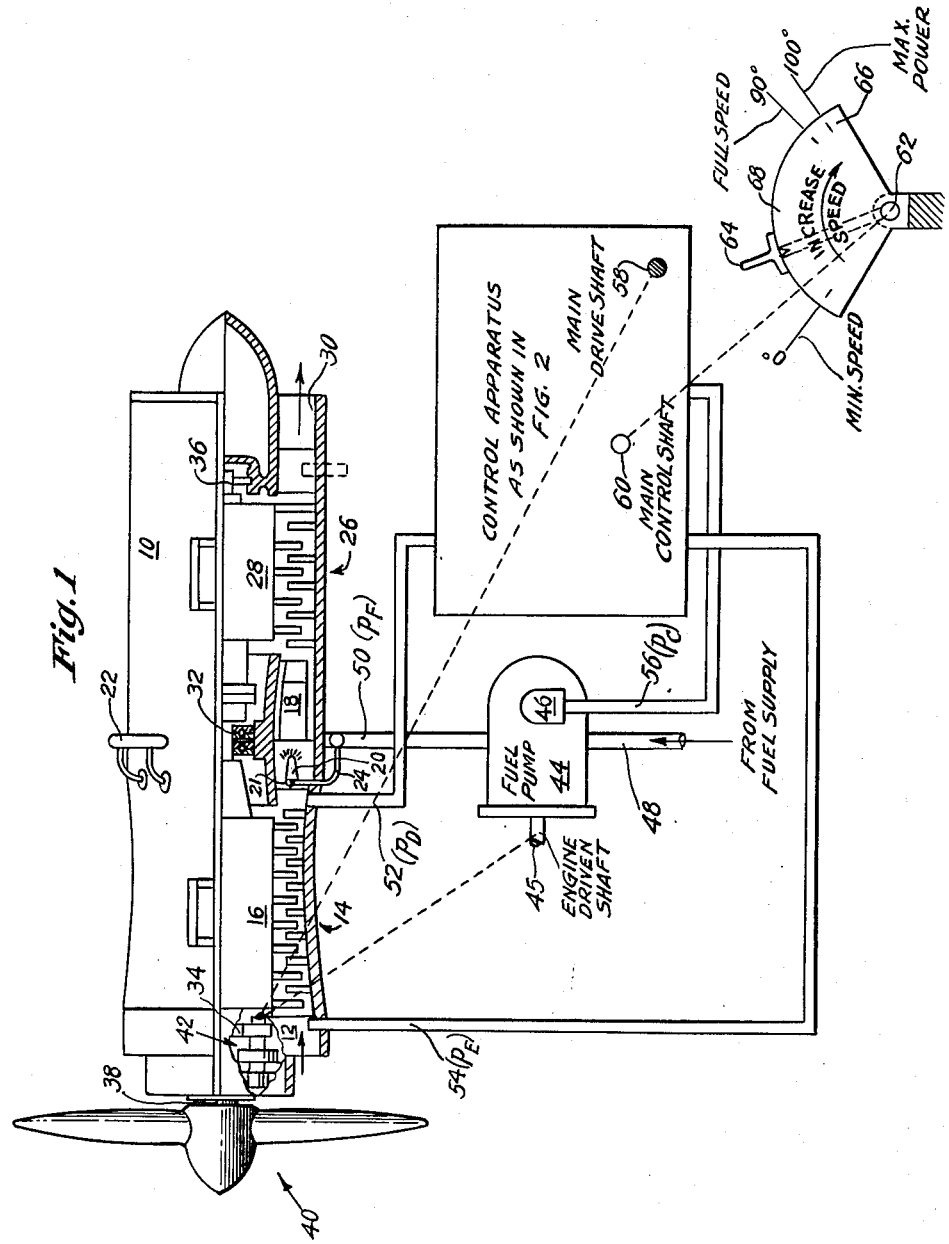
Figure 1 shows, somewhat diagrammatically, an engine suitable for propeller-and-jet propulsion of aircraft, together with its associated fuel pump and an engine control lever, there being also shown principal connections between the engine and a diagrammatic illustration of the fuel and speed control apparatus of Fig. 2.

*Figure 1*

Referring to the drawing, Fig. 1, there are shown the principal elements of the engine above referred to, a supporting casing 10, an air inlet 12, a multistage compressor 14, a compressor rotor shaft 16, one each of a number of combustion chambers 18, one of a corresponding number of fuel discharge nozzles 20 connected to a generally circular manifold 22 by means of a conduit 24, a multistage turbine 26, a turbine rotor shaft 28 connected to the compressor rotor shaft 16, a tail pipe 30 for discharging combustion gases from turbine 26, a center bearing 32 and end bearings 34 and 36 supported by casing 10, a propeller shaft 38 to which is fixed a propeller 40, and a gear train 42 connecting shafts 16 and 38 for rotating propeller 40 at a speed proportional to engine speed and for operating the fuel pump and other accessories. Construction of a jet engine used solely for jet propulsion is similar to that of the engine of Fig. 1 except for omission of the propeller and propeller shaft and corresponding modification of the gear train. Since, in a jet engine, the power developed by the turbine is used only for operating the compressor and accessories, single-stage rather than multi-stage turbine construction is generally employed.

A fuel pump 44 has associated therewith delivery varying means diagrammatically shown at 46. Pump 44 is connected to a pump inlet conduit 48 and to a pump discharge conduit 50. Fuel flows from the indicated source of supply through inlet conduit 48, pump 44, and pump discharge conduit 50 to manifold 22 in the engine. Pump 44 is operated by a drive shaft 45 connected to gear train 42 in the engine, or any other suitable source of power. The delivery varying means is responsive to a variable control oil pressure ($p_c$) in a conduit 56 which is regulated by the control apparatus of Fig. 2.

In each of the discharge nozzles 20 there is a series of fixed slots, one of which is indicated at 21, through which fuel enters the nozzles from conduits 24. The fuel flow from the nozzles is directly proportional to the effective area of slots 21 and is a square root function of the drop across the slots between the pressure in conduits 24, which is substantially equal to the pressure ($p_F$) in conduit 50, and the pressure in the combustion chamber. It follows, therefore, that the fuel pump delivery is a function of the pressure ($p_F$) in conduit 50 which is controlled by the delivery varying means 46.

When it is desired to limit the range of fuel pressure so that its value at maximum fuel flow is less than that corresponding to the square root function of the drop across slots 21, the nozzles may be provided with auxiliary slots supplied by another manifold connected to conduit 50 through a pressure-responsive flow-divider which opens at a predetermined value of the pressure ($p_F$). In this manner the pressure ($p_F$) may be maintained sufficiently high to produce satisfactory nozzle discharge without requiring the pump to operate under unfavorable pressure conditions at maximum flow.

Figure 2:
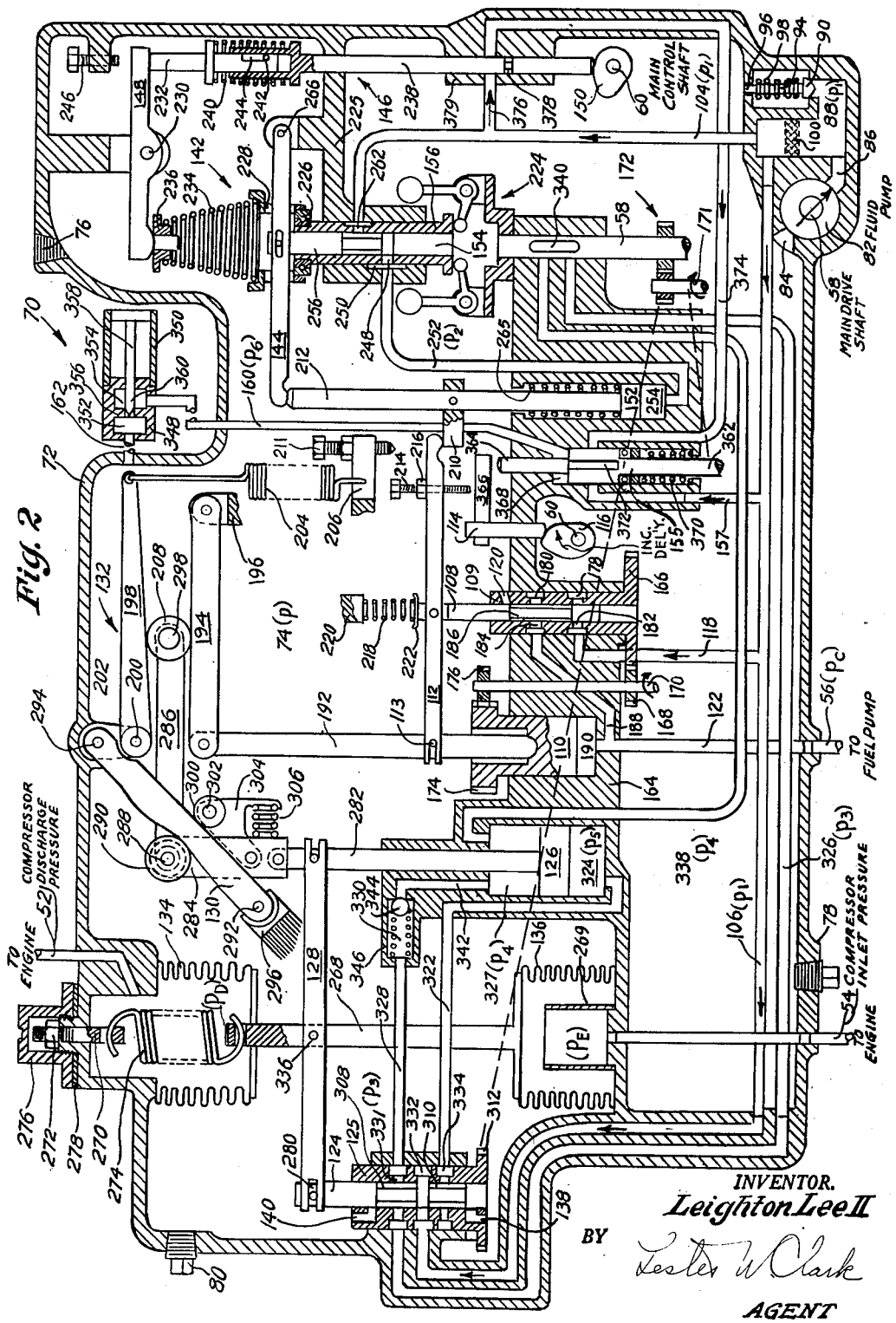
Fig. 2 shows, also somewhat diagrammatically, fuel and speed control apparatus embodying an hydraulic control system for regulating the engine fuel pump according to the principles of my invention.

The control apparatus of Fig. 2, diagrammatically shown in Fig. 1, is connected to a source of compressor discharge pressure ($p_D$) in the engine by a conduit 52 and to a corresponding source of compressor inlet pressure ($p_E$) by a conduit 54. As subsequently explained, the control apparatus is responsive to the pressure differential ($p_D - p_E$) which is an indication of air flow through the engine. The value ($p_D - p_E$) increases as the engine speed increases, as flight speed increases, and as the altitude of flight or entering air temperature decreases, and is also a function of the compressor characteristics.

A main drive shaft 58 (Figures 1 and 2) in the control apparatus is driven by the engine at a speed proportional to engine speed and a main control shaft 60 is rotatable in response to movement of a shaft 62 to which is fixed an engine control lever 64. Control lever 64 is manually operable in reference to a scale 68 on a fixed quadrant 66, scale 68 being calibrated in terms of degrees in relation to R. P. M. engine speed.

*Figure 2*

Referring to Fig. 2, there is shown somewhat diagrammatically an embodiment of my invention all principal elements of which, excepting a thermal control 70, are enclosed in a casing 72 having external connections with conduit 52 for supplying air to the apparatus at the compressor discharge pressure ($p_D$), with conduit 54 for supplying air to the apparatus at the compressor inlet pressure ($p_E$), and with conduit 56 for transmission of the variable control oil pressure ($p_c$) from the apparatus to the fuel pump delivery varying means 46 shown in Fig. 1. Casing 72 as shown in the drawing is of continuous cross-section but for purposes of manufacture and assembly may be made in an equivalent form comprising two or more separable elements as is the case in the embodiment of Fig. 3.

The control apparatus of Fig. 2 is a self-contained hydraulic system employing the interior of casing 72 as a reservoir 74 which is maintained approximately full of suitable hydraulic fluid at the pressure ($p$) in order to permit the working elements to operate in an oil bath and which is vented at a threaded port 76 to the atmosphere or other desired pressure source. If desired, reservoir 74 may be made a part of the oil system of the engine. In this case, a pair of plugs 78 and 80 otherwise serving as drain plugs are removed from casing 72 and the respective casing openings are then connected by suitable inlet and outlet conduits to the engine oil system. The main drive shaft 58 operates an hydraulic pump 82 which pumps fluid from reservoir 74 through an inlet port 84 and an outlet 86 into a chamber 88. The pressure ($p_1$) in chamber 88 is maintained at a substantially constant value, approximately 240 p. s. i. in the embodiment shown, by a relief valve 90, which allows fluid to flow from chamber 88 past valve 90, through a chamber 94 and an aperture 96 to reservoir 74 in opposition to a substantially constant force produced by a valve spring 98. Fluid from chamber 88 enters two main fluid conduits 104 and 106 downstream from a filter 100, and is conveyed at pressure ($p_1$) to elements of the apparatus hereinafter specified.

The control apparatus comprises four mechanically and hydraulically cooperative component systems, as briefly outlined in the immediately following numbered paragraphs, for regulating the variable control oil pressure ($p_c$); namely:

(1) A manual control system principally including a main servo valve 108, a main servo valve sleeve 109, a main power piston 110, a main floating lever 112, a push rod 114, and a cam 116 fixed to the main control shaft 60, for rendering pressure ($p_c$) variable by movement of the engine control lever 64, Fig. 1. Also included in the manual control system, as set forth herein, is a lever mechanism 132 comprising a pair of levers 194 and 198, a circular bearing 208 between said levers, a spring 204, and a rod 192 for loading piston 110 with a force due to spring 204. Fluid flows discontinuously to the manual control system through a conduit 118 connected to main fluid conduit 106 and is drained from the manual control system through an outlet passage 120 opening into reservoir 74 at the upper end of valve sleeve 109. The variable control oil pressure ($p_c$) is transmitted from the manual control system through a conduit 122 which is connected to conduit 56.

(2) A barometric control system principally including a barometric servo valve 124, a barometric servo valve sleeve 125, a barometric power piston 126, a barometric floating lever 128, a fixed elongated barometric cam 130, a positioning bar 286 for varying the position of bearing 208, and a pair of bellows 134 and 136 respectively connected to conduits 52 and 54. The pressure ($p_c$) is made a function of the compressor pressure differential ($p_D - p_E$) by transmission of movement of piston 126 through cam 130, positioning bar 286, and lever mechanism 132 to the main power piston 110 in the manual control system. Fluid flows discontinuously to the barometric control system through the main fluid conduit 106 and is drained from the barometric control system through one or the other of two outlet passages 138 and 140 in sleeve 125, which passages open into reservoir 74.

(3) A speed control system principally including a governor valve mechanism generally indicated at 142, a governor lever 144, a governor push rod assembly 146, a setting lever 148, a cam 150 on the main control shaft 60, and an overspeed power piston 152. In this system the pressure ($p_c$) is made a function of the engine speed by modifying movement of the main floating lever 112 of the manual control system in response to movement of the overspeed power piston 152. Fluid flows discontinuously to the governor valve mechanism 142 through conduit 104 and is drained from that valve mechanism through a chamber 154 in a governor valve sleeve 156, chamber 154 opening into reservoir 74.

(4) A thermal control system including the thermal control 70 and a thermal piston 155 for overriding the manual control system as a function of the engine temperature. Normally, there is no flow of fluid through the thermal control system, but when the predetermined limiting or maximum allowable temperature is exceeded fluid flows from main fluid conduit 106, successively through a conduit 157, past piston 155, and through a conduit 160, thermal control 70, and a conduit 162 to reservoir 74. Under conditions later described, fluid is also supplied to the thermal control system through a conduit 374.

*Manual control system*

A wall 164 is provided in reservoir 74 and is suitably bored or otherwise machined for housing and operation therein of some elements of each of the four component control systems previously defined.

In the manual control system, a gear 166 is provided at one end of main servo valve sleeve 109 for rotation of the sleeve in wall 164, sleeve 109 being installed with gear 166 at the lower side of wall 164 and having its upper end extending somewhat beyond the upper side of the wall. Gear 166 and hence sleeve 109 are rotated by another gear 168 fixed to a shaft 170 which in turn is driven from the main drive shaft through a suitable connection (not shown in Fig. 1). Similarly, a gear 174 is provided at the upper end of piston 110 which is both slidably and rotatably operable in wall 164 and is installed with gear 174 above the wall. Gear 174 is rotated by another gear 176 fixed to the upper end of shaft 170. Any other means of suitably rotating sleeve 109 and piston 110 may be employed, the purpose of such rotation being to avoid sticking of the main servo valve 108 in sleeve 109 and to prevent sticking of the piston in wall 164.

Valve sleeve 109 is provided with a pair of parallel circumferential grooves 178 and 180 and one or more corresponding ports 182 and 184 drilled radially at the vertical centers of the grooves. The upper end of conduit 118 opens opposite groove 178 and ports 182 are therefore continuously supplied with fluid at pressure ($p_1$). Groove 180 is similarly connected to the upper end of a passage 188 which is connected to conduit 122.

Valve 108 is undercut to form an annular chamber 186 and has a neutral position as shown in Fig. 2 in which the lower edge of the undercut is alined with the upper edge of port 182, and the upper edge of the undercut is alined with the lower edge of outlet passage 120. Ports 184 communicate with chamber 186 regardless of the position of valve 108 in its normal range of operation. When valve 108 is displaced downward so that port 182 opens into chamber 186, a path for flow is provided which successively includes conduit 118, groove 178, ports 182, chamber 186, ports 184, groove 180, passage 188, and conduit 122, at the upper end of which there is an expansible chamber 190 included between the lower end of piston 110 and wall 164. The value of the variable control oil pressure ($p_c$) in conduit 56 and chamber 190 is thus increased upon downward movement of valve 108 from its neutral position. Similarly, when valve 108 is displaced upward so that chamber 186 opens into outlet passage 120, a path for flow is provided from conduit 56 and chamber 190, through passage 188, groove 180, ports 184, chamber 186, and outlet passage 120 to reservoir 74, the pressure ($p_c$) being thereby decreased.

The left-hand end of main floating lever 112 has a pin-and-slot connection 113 with rod 192 which has a self-alining connection at its lower end with the bored interior of piston 110 so that vertical movement of the piston produces upward movement of rod 192 and simultaneously allows angular displacement of the rod with respect to the piston without causing the latter to bind in wall 164. The upper end of rod 192 is hinged to the left-hand end of lever 194 in mechanism 132, lever 194 having its right-hand end hinged to a fixed support 196. Above lever 194, mechanism 132 includes the lever 198 which has its left-hand end hinged at a pin 200 fixed in a support 202 above and approximately on the center-line of piston 110. The right-hand end of lever 198 is connected to tension spring 204 which has its lower end anchored in a fixed support 206. A measure of the downward force of spring 204 is transmitted from lever 198 to lever 194 through the circular bearing 208 the position of which is regarded as fixed in the present discussion. Piston 110 is subjected to an upward force proportional to the differential ($p_c-p$) between the respective pressures in chamber 190 and reservoir 74 and to a measure of the downward force of spring 204 which is transmitted to the piston through lever mechanism 132 and rod 192. The rate of spring 204 is high, so that the value of the differential ($p_c-p$) and hence the variable control oil pressure ($p_c$) may vary throughout a wide range of values corresponding to a relatively narrow range of movement of the piston which is positioned to maintain the forces acting thereon in equilibrium.

While the drawing shows the right-hand end of main floating lever 112 engaged with a finger 210 pinned to a rod 212 which is fixed to the upper side of the overspeed power piston 152, when considering the manual control system independently of the speed control system, as in the present discussion, it may be assumed that the right end of lever 112 is free, whence the lever is positioned by: (1) push rod 114 which carries an arm 366 engaging an adjusting screw 214 threaded into lever 112 and locked in place by means of a nut 216; (2) rod 192 which serves as a pivotal support for the left-hand end of lever 112; and (3) a light spring 218 compressed between a fixed support 220 and a retainer 222 supported by the upper end of valve 108, which causes the adjusting screw 214 and hence lever 112 to follow movement of push rod 114 as the latter is actuated by cam 116. It is noted from the above that, excepting the substantially negligible force due to spring 218, the main servo valve 108 does not directly affect the position of lever 112 but instead is positioned by the lever, there being equal and opposite forces proportional to pressure ($p$) on the ends of valve 108. When considering the manual control system only, the position of bearing 208 and hence the downward force of rod 192 corresponding to any given position of piston 110 is regarded as fixed. In the neutral position of servo valve 108, as shown, the manual control system is in a state of equilibrium; i. e., there is no flow of fluid in the system, the pressure ($p_c$) is such as to maintain piston 110 in a position corresponding to the position of cam 116 and the neutral position of valve 108, and the pump delivery corresponds with the value of pressure ($p_c$) trapped in the system by closure of the servo valve.

Upon clockwise movement of control lever 64, Fig. 1, and consequent clockwise movement of main control shaft 60 and cam 116, lever 112 moves clockwise about connection 113 and servo valve 109 is depressed from its neutral position. Consequently, as previously explained, the value of pressure ($p_c$) and hence the fuel flow to the engine increase. Pressure ($p_c$) continues to increase until piston 110 responds by raising lever 112 and valve 108 a sufficient amount to restore the valve to its neutral position, following which no further change occurs as long as the position of shaft 60 remains undisturbed. Similarly, upon counterclockwise movement of control lever 64, Fig. 1, and corresponding counterclockwise movement of shaft 60 and cam 116, lever 112 moves counterclockwise about its connection with rod 192 and the servo valve is elevated above its neutral position. In this case, as previously explained, the value of pressure ($p_c$) and hence the fuel flow decrease, continuing to do so until piston 110 responds by lowering rod 192 and lever 112 to a new position at which servo valve 108 is again restored to its neutral position. When servo valve 108 is in its neutral position, the value of pressure ($p_c$) and hence the fuel flow is determined by the position of control shaft 60 for a given fixed position of bearing 208 in lever mechanism 132.

As stated earlier, the engine speed corresponding to any given value of fuel flow varies as a function of entering air density, flight speed, and other factors over which the manual control system has no control and to which it is unresponsive. It follows, therefore, that the manual control system provides a means of regulating the variable control oil pressure ($p_c$) from minimum to maximum values corresponding to a predetermined range of clockwise movement of the engine control lever 64, Fig. 1, and depending upon the downward force transmitted by rod 192 to piston 110.

*Speed control system*

Governor valve mechanism 142 includes a flyball speed responsive device 224 operated by the main drive shaft 58 for varying the vertical position of governor valve sleeve 156 as a function of engine speed. The valve sleeve operates in a suitably bored projection 225 of casing 72. The inner race of a ball bearing assembly 226 is fastened to the upper end of sleeve 156 and the outer race of bearing assembly 226 supports a lower governor spring retainer 228 which is slotted so that lever 144 and retainer 228 are independently movable in relation to each other in a vertical plane. Setting lever 148 is pivoted approximately at the center of its length on a fixed pin 230 and has its right-hand end supported by a follower push rod 232 in governor push rod assembly 146. A governor spring 234 is compressed between lower retainer 228 and an upper governor spring retainer 236 which is forced upward by spring 234 against the left-hand end of setting lever 148. Bearing assembly 226 permits sleeve 156 to rotate while retainer 228 remains stationary and hence prevents torsional stress in spring 234.

Push rod assembly 146 is actuated by cam 150 in response to movement of the engine control lever 64, Fig. 1, for varying the position of setting lever 148 and the upper governor spring retainer 236, and hence for varying the load of spring 234 on valve sleeve 156 in opposition to the upward force of the speed responsive device 224. Assembly 146 includes the follower push rod 232 having its lower end slidably operable in a hollow sleeve formed on the upper end of a push rod 238 engaging cam 150. During a predetermined range of movement of control lever 64 in which the engine speed is manually variable, a spring 240 maintains the overall length of the assembly 146 at a value determined by engagement of a pin 242 in push rod 238 with the lower end of a slot 244 in follower push rod 232. When, however, setting lever 148 engages an adjusting screw 246 so that further upward movement of rod 232 is prevented, upward movement of push rod 238 is permitted by compression of spring 240, the length of slot 244 and the distance between the lower end of rod 232 and the corresponding portion of rod 238 being sufficient to prevent jamming of the push rod assembly.

In the particular embodiment shown, the downward force of governor spring 234 varies substantially directly with the spring deflection, while the upward force due to speed responsive device 224 is proportional to the square of the engine speed. When these forces are in equilibium, there is no vertical movement of sleeve 156. The position of the sleeve corresponding to a condition of equilibrium may vary over a predetermined range in which a port 248 in sleeve 156 opens into an annular recess 250 in projection 225. Cam 150 is generated so that as control lever 64 is advanced clockwise throughout a predetermined range in reference to the uniformly calibrated R. P. M. scale 68, Fig. 1, the deflection of spring 234 is varied at a non-uniform rate so that the speed required to produce a state of equilibrium increases to the scale value corresponding to the position of the lever.

Recess 250 adjacent sleeve 156 is connected by a conduit 252 to a chamber 254 below overspeed power piston 152. The pressure ($p_2$) in chamber 254 is controlled by a governor valve 256 which cooperates with sleeve 156. Valve 256 has a pin-and-slot connection with governor lever 144 and is slidably operable inside sleeve 156 only in response to movement of lever 144. The governor valve is undercut to provide an annular chamber which is connected through a port 262 in sleeve 156 with the upper end of main fluid conduit 104 so that the annular chamber is maintained at the pressure ($p_1$). The land at the lower end of valve 256 is the same width as port 248 so that when valve 256 is in its neutral position in respect to sleeve 156, as shown, port 248 is just covered.

The right-hand end of governor lever 144 is hinged on a pin 266 in projection 225 and its left-hand end is supported by rod 212. Movement of the overspeed power piston 152 and hence of rod 212, either upward or downward, controls movement of governor lever 144 and governor valve 256. Whenever the end of the main floating lever 112 is engaged with the finger 210, and push rod 114 does not touch screw 214, movement of piston 152 controls the position of lever 112 independently of cam 116, whereby the speed control system is effective to modify the fuel flow called for by the manual control system. A spring 265 biases piston 152 downward in opposition to the pressure differential ($p_2-p$) so that there is a different predetermined position of piston 152 corresponding to each value of the differential. An adjusting screw 211 is provided in support 206 for limiting upward movement of the right-hand end of lever 112, thereby limiting travel of piston 152 and finger 210. This establishes a minimum value of the variable control oil pressure ($p_c$) in order to avoid burner "blow-out" and consequent engine stoppage.

*Coordination of the manual and speed control systems*

Both cam 116 in the manual control system and cam 150 in the speed control system are fixed to control shaft 60 for simultaneous clockwise operation as control lever 64, Fig. 1, is advanced clockwise through the predetermined range. In the embodiment shown, the total range of movement of lever 64 is approximately 100°.

In a condition of steady state operation at constant speed and constant fuel flow, the positions of all movable elements in both the manual and the speed control systems are fixed except in respect to rotation, main servo valve 108 and governor valve 256 are in their neutral positions, pressures ($p_2$) and ($p_c$) are substantially constant, and as subsequently explained and as shown in Fig. 2 main floating lever is supported by finger 210 so that there is a slight amount of clearance between rod 114 and screw 214.

When control lever 64 is advanced clockwise from the position shown in Fig. 1 to another position within the first 90° range of movement of the lever, the lift of cam 116 decreases and pushrod 114 is further separated from adjusting screw 214, the main floating lever 112 being prevented from instantaneously following the push rod by finger 210 in the speed control system. Simultaneously with movement of cam 116, however, cam 150 also turns clockwise to elevate push rod assembly 232 and to thereby turn setting lever 148 counterclockwise on pin 230. The downward force of governor spring 234 is thus increased and governor valve sleeve 156 is depressed from its neutral position in respect to valve 256 so that fluid flows from conduit 252 through recess 250 and port 248 into chamber 154, thereby decreasing pressure ($p_2$) in conduit 252 and chamber 254. The overspeed power piston 152 and rod 212 consequently move downward, allowing main floating lever 112 to turn clockwise, thereby moving main servo valve 108 below its neutral position and producing increased fuel flow and engine speed as previously explained.

In addition to allowing the rightward end of lever 112 to descend, as explained above, downward movement of rod 212 and finger 210 simultaneously allows the left end of governor lever 144 and hence governor valve 256 to move downward so as to reduce the effective area of flow from port 248 to chamber 154, thereby retarding decrease of pressure ($p_2$) and the resultant increase in the value of fuel flow.

The amount of clockwise movement of lever 112 about connection 113 corresponding to downward movement of rod 212 is limited by push rod 114. If the engine control lever is advanced sufficiently far and/or rapidly, rod 212 quickly moves downward so that finger 210 is disengaged from lever 112 when screw 214 contacts push rod 114 and downward movement of lever 112 is thereby arrested. In this condition, the manually operated cam 116 determines the position of the rightward end of lever 112 and the speed control system becomes temporarily ineffective. The fuel flow to the engine corresponding to a given position of the engine control lever is thereby rendered maximum during acceleration of the engine. The maximum fuel flow during periods of acceleration is determined by the control lever setting acting through cam 116, and not by the difference between actual speed and desired speed.

This limitation of the fuel flow during acceleration is necessary to prevent overheating of the engine.

As the engine speed approaches the value corresponding to the position of control lever 64, governor valve sleeve 156 rises so that when the engine speed has the desired value corresponding to the lever setting, port 248 is closed by the valve. When this occurs, screw 214 in lever 112 is again lifted slightly off push rod 114 by finger 210. During this process, the main power piston 110 rises to a new position corresponding to the new position of rod 212.

When control lever 64 is moved in a counterclockwise direction from one position to another in the 0°–90° range of lever movement, reversal of the above process takes place. Simultaneously with upward movement of rod 114, push rod assembly 146 is lowered so that setting lever 148 reduces the deflection and load of governor spring 234 and governor valve sleeve 156 rises to permit flow of fluid at pressure $(p_1)$ from conduit 104, through port 262, past valve 256, through port 248 and recess 250 into conduit 252 and chamber 254. Pressure $(p_2)$ is thereby increased and the overspeed power piston rises. Although elevation of push rod 114 by cam 116 tends to reduce clearance between screw 214 and rod 114, this clearance is increased in response to the upward movement of rod 212 and finger 210, the amount of clearance between screw 214 and rod 114 being greatest when the amount of engine overspeeding is greatest in respect to the new lower desired value of speed corresponding to the new lever position. In other words, during deceleration the speed control system determines the fuel flow. Maximum deceleration is limited by stop 211. The fuel flow decreases owing to counterclockwise movement of lever 112 as explained heretofore, and as the engine decelerates, the clearance between push rod 114 and screw 214 is reduced to a new value which remains substantially constant when equilibrium of the combined manual and speed control systems is restored.

With the position of control lever 64 fixed, the engine speed may vary owing to variations in fuel quality, combustion temperatures, or other factors over which the barometric or thermal control systems may or may not have control.

When, under such circumstances, the engine speed increases without any change in position of control lever 64, sleeve 156 is raised from its neutral position in respect to valve 256 and, as previously shown, pressure $(p_2)$ is thereby increased. The overspeed power piston rises and the process of reducing the variable control oil pressure $(p_c)$, the fuel flow, and hence the engine speed, follows, until the desired value of speed is restored. When the engine speed decreases at a fixed position of the control lever, the process of increasing the fuel flow to restore the desired value of engine speed is substantially the reverse of the process which occurs upon overspeeding.

As control lever 64 is moved between its 90° and 100° quadrant positions, the lift of cam 150 remains substantially constant at a maximum value. The engine speed therefore has a substantially constant maximum value when the lever is in its 90°–100° range of travel. Within this range, however, the lift of cam 116 continues to increase to a maxium value corresponding to the extreme or 100° position of lever travel. Response of the combined manual and speed control systems to movement of the control lever in this ten-degree range is similar to that in cases previously explained in which the fuel flow and engine speed vary as a function of both the manual and speed control systems, except that the speed control system is effective to override the manual control system to a relatively greater extent in order to maintain a substantially constant maximum value of speed. As the fuel flow is increased at constant maximum engine speed, the engine torque and hence the brake-horsepower increase, the maximum brake-horsepower being developed at the 100° lever position. The adjusting screw 246 may be set to cause actuation of spring 240, if desired, at any position of cam 150, and to thereby establish the maximum speed at a lower value than is otherwise obtainable as a function of the lift of the cam. Alternatively, if desired, the lift of cam 150 may be allowed to increase throughout the 100° range of lever movement.

*Barometric control system*

The operation of lever mechanism 132 and positioning bar 286 and their relation to rod 192 is explained in the following description of the barometric control system and in subsequent explanations of coordinated functions of the barometric and other component systems.

In the barometric control system, the upper end of bellows 134 is fixed inside casing 72 directly over bellows 136 which is of substantially the same effective area and which has its lower end fixed to a portion of wall 164. A bar 268 rigidly connects the free ends of the bellows to each other so that expansion or contraction of either is accompanied by an equal and opposite movement of the other. A cylindrical stop 269 is provided to limit contraction of bellows 136. Inside bellows 134 and at its upper end there is an adjustable spring support 270 the position of which can be varied as desired by means of a nut 272. Between the lower end of support 270 and the upper end of bar 268 there is a tension spring 274 for biasing the bellows and bar assembly upward in opposition to the differential $(p_D - p_E)$. A cover 276 and a gasket 278 are provided for enclosing support 270 and nut 272 which, upon removal of cover 276, are accessible from the exterior of the casing. The barometric lever 128 is hinged at approximately the midposition of its length on a pin 336 in bar 268, the left end of the lever being connected to the upper end of barometric valve 124 by means of a pin-and-slot connection 280 which permits vertical movement of valve 124 in sleeve 125 as the angular position of lever 128 changes. The right-hand end of lever 128 has a pin-and-slot connection with a rod 282 fixed to the barometric power piston 126. The upper end of rod 282 above its connection with lever 128 is hinged to a link 284 which is pivotally connected to the left end of positioning bar 286 by means of a pin 288 on which turns a roller 290 engaged with the fixed barometric cam 130. The position of cam 130 is fixed by a pair of pins 292 and 294 respectively fitted into fixed supports 296 and 202. The cam is slidable on the pins so that it can be removed from the apparatus for replacement or any other desired purpose. The right-hand end of positioning bar 286 has a pin 298 fixed therein on which the circular bearing 208 is mounted. Roller 290 is held in contact with the upper surface of cam 130 by means of another roller 300 which is rotatable on a pin 302 fixed in a triangular bracket 304. Bracket 304 is pivoted to link 284 and a spring 306, compressed between the link and one side of the bracket, holds roller 300 against the lower side of cam 130. Thus, as rod 282 moves in a vertical direction, link 284 follows so that roller 290 remains in engagement with the contoured upper face of cam 130. Both vertical and angular movement are imparted to link 284 in this process so that, when piston 126 and rod 282 descend, bearing 208 is moved leftward and the downward force on main power piston 110 due to spring 204 is increased; and, similarly, when piston 126 and rod 282 rise, bearing 208 is moved rightward and the downward force on the main power piston 110 is decreased.

The barometric servo valve 124 is undercut to provide a pair of annular chambers 308 and 310 between the valve and sleeve 125 in which the valve is slidable. The vertical position of valve sleeve 125 in reference to casing 72 is fixed and the sleeve is rotated by means of a gear 312 driven from shaft 171 through a suitable connection (not shown). The valve sleeve has three pairs of ports 332, 334, and 331.

In all operating positions of valve 124, ports 331 open into the annular chamber 308 and ports 334 open into the annular chamber 310. Fluid in chambers 308 and 310 is maintained at pressures designated $(p_3)$ and $(p_4)$, respectively, as later explained.

Ports 332 are just closed when valve 124 is in its neutral position, as shown in the drawing, the width of the ports being substantially equal to the width of the valve land between the lower end of chamber 308 and the upper end of chamber 310. The outlet passage 138 in sleeve 125 is also just closed by the land at the lower end of the valve and outlet passage 140 is similarly just closed by the land at the upper end of the valve, when the latter is in its neutral position.

Ports 332 are connected to the end of conduit 106 so that the ports 332 are continuously supplied with fluid at pressure $(p_1)$. Ports 334 are connected to one end of a conduit 322 which has its other end connected to an expansible chamber 324 below piston 126. Ports 331 are connected to a pair of conduits 326 and 328. Conduit 328 is connected to a check valve chamber 330 in wall 164 above the barometric power piston 126, for transmitting the pressure $(p_3)$ to chamber 330 from chamber 308. Conduit 326 is supplied with fluid from chamber 308 at pressure $(p_3)$ and is intermittently connected by means of a slot 340 on main drive shaft 58 to a conduit 338 for supplying fluid at a pressure $(p_4)$ to a chamber 327 above piston 126. Slot 340 intermittently connects conduits 326 and 328 as it rotates and is descriptively referred to as a "chopper" valve. It serves to restrict flow between conduits 326 and 328. The area of slot 340 is substantially greater than that of an equivalent fixed restriction between the two conduits. A number of parallel slots may be substituted for the single slot 340, if desired.

When the barometric servo valve 124 is elevated above its neutral position, fluid is permitted to flow from annular chamber 308 through outlet 140 to reservoir 74, thereby reducing the pressure $(p_3)$ in conduits 326 and 328. Simultaneously, fluid is permitted to flow from conduit 106 through port 332, chamber 310, and conduit 322 to chamber 324, thereby increasing the pressure $(p_5)$ in chamber 324.

When valve 124 is depressed below its neutral position, fluid is permitted to flow from conduit 106 through port 332, and chamber 308, to conduits 326 and 328, thereby increasing the pressure $(p_3)$ in conduits 326 and 328. Simultaneously, fluid flows from chamber 310 through outlet 138 to reservoir 74, thereby reducing the value of pressure $(p_5)$ in conduit 322 and chamber 324.

The position of rod 268 and hence the position of pin 336 is determined by the pressure differential $(p_D - p_E)$ acting on bellows 134 and 136 and by spring 274, there being a different predetermined position of the pin for each value of the differential, at any given fixed position of spring support 270. In steady state operation, when the barometric servo valve is in its neutral position, as shown, the positions of the power piston 126 and of rod 282 are predetermined by the position of fulcrum pin 336 and the pressure differential $(p_5 - p_4)$ acting on piston 126. This differential has a substantially constant value when the barometric control system is in equilibrium, and equals zero when the apparatus is constructed so that no force is required to maintain bearing 208 in any fixed position corresponding to a fixed position of pin 336.

The barometric control system varies the position of power piston 126 and rod 282 to maintain servo valve 124 in its neutral position as the position of fulcrum pin 336 changes in response to changes in the value of the differential $(p_D - p_E)$. The barometric control system therefore positions bearing 208 as a function of the barometric pressure differential. The power for positioning bearing 208 is supplied by the hydraulic system. The downward load on main power piston 110 due to spring 204 is therefore modified in accordance with the barometric pressure differential.

Chamber 327 is connected to check valve chamber 330 by a conduit 342 for flow from chamber 327, past a ball check valve 344 into chamber 330, when the pressure $(p_4)$ exceeds pressure $(p_3)$ in chamber 330 by a small amount predetermined by a spring 346 which loads the valve. The check valve prevents reverse flow from chamber 330 to conduit 342 at all times.

Considering the barometric control system independently of the manual control and other component control systems, when a condition of equilibrium is disturbed by an increase in compressor discharge pressure $(p_D)$ or a decrease in compressor inlet pressure $(p_E)$, and hence when the differential $(p_D - p_E)$ increases, bar 268 and fulcrum pin 336 are lowered to a new position. The rightward end of barometric floating lever 128 is not affected until pressure changes produced by the valve cause movement of piston 126. Downward movement of pin 336 causes downward movement of the servo valve 124 and consequent increase of pressure $(p_3)$ in chamber 308 and conduit 328 and 326 as previously explained, and also decrease of pressure $(p_5)$ in chamber 310, conduit 322, and chamber 324 below power piston 126. Increase of pressure $(p_3)$ in conduit 326 produces a flow through chopper valve 340, resulting in a corresponding increase in pressure $(p_4)$ in chamber 327 above the power piston. The rate of change of pressure $(p_4)$ is a function of chopper valve 340. As the differential increases, the barometric power piston 126 moves downward, thereby turning lever 128 clockwise on fulcrum pin 336 and moving servo valve 124 upwards toward its neutral position. The downward movement of piston 126 and rod 282 continues until the neutral position of valve 124 is restored and rod 282 is in a new position corresponding to the neutral position of the valve and the new lower fixed position of pin 336, When equilibrium occurs, pressures ($p_4$) and ($p_5$) are again substantially constant.

In the above train of events, the particular value acquired by the differential ($p_4-p_5$) in restoring valve 124 to its neutral position is not important, since all that is required is that the position of rod 282 corresponds to the neutral position of the valve. If movement of rod 282 is opposed by frictional or other forces, the control operates to vary the differential ($p_4-p_5$) sufficiently to compensate such forces. During the process, check valve 344 remains seated, since the pressure ($p_4$) cannot increase above the pressure ($p_3$).

When the compressor pressure differential ($p_D-p_E$) decreases, with the barometric control system in an initial state of equilibrium, bar 268 and pin 336 rise causing clockwise movement of lever 128 about its pivotal connection with rod 282 and raising the servo valve 124 above its neutral position. As previously explained, pressures ($p_3$) and ($p_4$) decrease and pressure ($p_5$) increases, thereby causing piston 126, rod 282, and the right-hand end of lever 128 to move upwardly so that the servo valve moves downward toward its neutral position. During this process, decrease in the value of pressure ($p_3$) allows check valve 344 to move leftward, thereby allowing fluid to flow from chamber 327 so that pressure ($p_4$) decreases more rapidly than would be permitted by reversed flow from conduit 338 through chopper valve 340. Hence rod 282 moves upwardly (in a fuel flow decreasing direction) more rapidly than it moves downwardly (in a fuel flow increasing direction). Equilibrium of the barometric control system is restored with valve 124 in its neutral position, with fulcrum pin 336 in a new higher fixed position, with rod 282 in a corresponding new higher fixed position in which the upward and downward forces on the rod are in equilibrium, and with check valve 344 again seated. As is apparent from the drawing, when movement of fulcrum pin 336 displaces the barometric servo valve 124 in either direction from its neutral position, the barometric power piston 126 is required to move approximately twice as far in the same direction to restore the valve to its neutral position.

*Coordination of the manual, speed, and barometric control systems*

The manual, speed, and barometric control systems cooperate to regulate the fuel flow and engine speed as a function of manual control, speed, and the compressor pressure differential ($p_D-p_E$). The operation of the combined manual and speed control systems were previously explained on the assumption of a fixed position of circular bearing 208 in lever mechanism 132. The barometric control system varies the position of bearing 208, thereby varying the downward force on main power piston 110 and hence varying the value of the variable control oil pressure ($p_c$) in chamber 190 and conduits 122 and 56.

As bearing 208 moves leftward, corresponding to downward movement of the barometric power piston 126 produced by an increase of the compressor pressure differential ($p_D-p_E$), the force transmitted by the bearing from spring 204 and lever 198 to lever 194 and rod 192 is increased so that the value of pressure ($p_c$) corresponding to the position of main control shaft 60 increases. Conversely, as bearing 208 moves rightward, corresponding to decrease of the differential ($p_D-p_E$), the pressure ($p_c$) decreases.

It is thus seen that the value of the variable control oil pressure ($p_c$) corresponding to any given position of the manual control lever 64, Fig. 1, depends upon the barometric control system, the pressure ($p_c$) increasing as the differential ($p_D-p_E$) increases, as when the engine speed increases, the speed of flight increases, or as the altitude of flight decreases.

Since the compressor pressure differential increases as the engine speed increases, it follows that the barometric control system controls the rate of acceleration when the engine control lever is advanced. On movement of the lever, within the first 90° range of operation, from one position to another corresponding to a higher rate of speed, the initial value of the pressure ($p_c$) corresponds to the initial value of the differential ($p_D-p_E$) and to the initial lever position. The increase of pressure ($p_c$) due to movement of the manual control is relatively rapid, but the corresponding increase due to increase of the differential ($p_D-p_E$) occurs only as the engine speed increases and as the barometric control system responds to such speed increase. The barometric control system thus serves to control acceleration and deceleration of the engine.

When the entering air density increases as a function of speed and altitude of flight, bearing 208 moves leftward to increase the pressure ($p_c$) and the fuel flow as above explained. Conversely, as the flight speed decreases and the altitude increases, the differential ($p_D-p_E$) decreases and bearing 208 moves rightward to decrease the pressure ($p_c$). The barometric control is sometimes descriptively referred to as the altitude control, and cam 130 is customarily contoured with closer regard to altitude compensation than to acceleration control, particularly since the latter is accomplished to some extent by chopper valve 340.

The contour of the barometric cam 130 is made to provide a desired position of bearing 208 for every value of the compressor pressure differential. In steady state operation, in which the temperature control system is ineffective and the control apparatus is in equilibrium, the fuel flow is dependent upon: (1), the manual and barometric control systems; and, (2), the speed control system which overrides these combined systems to reduce the fuel flow, as previously explained.

*Thermal control system*

The thermal control system is essentially a means for overriding the manual control system to reduce the fuel flow and engine speed when a predetermined limiting value of temperature is exceeded.

Thermal control 70, as shown, includes a body 348 on which is fixed a thin walled tube 350 which has its right-hand end closed. Body 348 is provided with a pair of chambers 352 and 354 separated by an apertured wall 356 and connected to conduits 162 and 160, respectively. A rod 358 is fixed to the closed right-hand end of tube 350 and is slidably operable in the apertured end of body 348 on which tube 350 is assembled. The left-hand end of rod 358 is contoured as a valve 360 which is normally seated in wall 356 to prevent flow from chamber 354 to chamber 352. Tube 350 and rod 358 are made from materials having substantially different coefficients of thermal expansion, so that when the tube and rod are heated, the tube expands faster than the rod, the thermal control generally being made so that the valve remains closed until the predetermined limiting temperature is exceeded. The control is installed with tube 350 exposed to the engine temperature, as in the tail pipe 30 of the engine of Fig. 1. Then, when the tail pipe temperature exceeds the limiting value, the valve opens to permit flow from conduit 160 through chamber 354, past valve 360, into chamber 352, and through conduit 162 to reservoir 74. The pressure ($p_6$) in conduit 160 is decreased as valve 360 opens.

The thermal piston 155 functions as a chopper valve similar to chopper valve 340 in the barometric control system. It consists of a generally cylindrical center portion operable in an apertured portion of wall 164 by means of a shaft 362 which is rotated concurrently with shaft 171. A push rod 364 is attached to the upper end of the piston and extends through wall 164 for engagement, under conditions to be specified, with a finger 366 fixed to push rod 114. A chamber 368 is provided above piston 155, and the latter is biased upwardly by a spring 370. Piston 155 is provided with a slot 372 so that when the piston is rotated chamber 368 is intermittently connected through slot 372 to the upper end of conduit 157 leading to main fluid conduit 106 and to one end of conduit 374, the other end of which is normally closed by push rod 238.

When valve 360 in thermal control 70 is closed, the pressure in chamber 354 is maintained at pressure ($p_1$), as in conduit 157, and piston 155 is held downward so that push rod 364 does not contact finger 366. When the limiting engine temperature is exceeded, however, valve 360 opens and fluid is drained from chamber 368, the pressure therein thereby being reduced owing to a drop across slot 372, so spring 370 forces valve 155 upwards and causes push rod 364 to engage finger 366, causing the latter to rise and to move the main floating lever in a counterclockwise or fuel flow decreasing direction. A decrease of the value of pressure ($p_c$) results and the fuel flow and engine speed are decreased below the values corresponding to the manual control setting. The flow remains at its decreased rate until the engine temperature is reduced to or slightly below the limiting value, whereupon thermal control valve 360 closes, valve 155 moves downward, and normal operation is resumed.

The thermal control used in the fuel control apparatus need not necessarily be the particular type shown since any temperature responsive device functionally equivalent to control 70 may be employed if desired.

Provision is made for resetting the thermal control system, as follows:

Fluid may be supplied at pressure ($p_1$) to conduit 374 from a conduit 376 which is connected to conduit 104. This supply is controlled by an annular groove 378 in a portion of rod 238 which is guided by a portion 379 of casing 72. The ends of conduits 376 and 374 enter portion 379 of casing 72 and are separated from each other by rod 238 when the position of cam 150 corresponds to any position of the engine control lever in a preselected range of movement of lever 64, which may, for example, be the 0°–90° range. When the control lever is further advanced, however, the lift of cam 150 increases so that conduit 374 is opened through groove 378 to conduit 376. At normal engine temperatures, no flow occurs past groove 378 since the same pressure ($p_1$) exists on both sides of it. However, when the limiting engine temperature is exceeded and thermal control valve 360 opens, chopper valve 155 is supplied with fluid at pressure ($p_1$) by both conduits 157 and 374, and the pressure in chamber 368 corresponding to any opening past valve 360 is greater than in the previously explained case in which conduit 374 was closed by rod 238.

Thus, while the action of thermal control 70 is always the same in respect to temperature and rate of valve opening, the response of thermal piston 155 is less rapid when the control lever is in its last ten degree or other desired range of travel, in which the engine speed setting remains constant and the fuel flow is manually variable to vary the engine power.

The two kinds of thermal override control are sometimes referred to as applying to normal and emergency operation, respectively. Thus, when the lever is advanced in the 90°–100° range to increase the fuel flow to obtain increased or emergency power, thermal override is desired to occur less rapidly and at a higher value of temperature than in normal operation in the 0°–90° range of control lever travel.

The manner in which the manual and barometric control systems are coordinated in order to control the pressure ($p_c$) and the fuel flow as joint functions of the engine control lever and the compressor pressure differential is apparent from the foregoing. The speed and thermal control systems are shown to be override controls for preventing excessive engine speed and temperature.

*Figure 3*

Referring to Fig. 3 of the drawing, there is shown a cross-sectional view of the apparatus of Fig. 2 substantially as built. Those elements in Figs. 3 to 8 which exactly correspond to their counterparts in Fig. 2 have been given the same reference numerals and will not be individually described in connection with the Figs. 3 to 8.

The path of fluid flow in the apparatus of Figs. 3 to 8 is substantially the same in all functional aspects as that previously described in connection with Fig. 2; the particular sections of Figs. 3 to 8, however, are not adequately illustrative of the conduits and/or passages corresponding to those shown somewhat diagrammatically but nevertheless completely in Fig. 2. In description of Figs. 3 to 8, therefore, reference to many structural details of fluid flow paths are necessarily omitted.

The embodiment of Fig. 3 includes four major castings; namely, a flange casting 380, a base 382, a bracket 383, and a cover 384 arranged in the stated order. Base 382 is separably fastened to flange casting 380; bracket 383 is correspondingly separably fastened to base 382; and cover 384 is also separably fastened to base 382 for enclosing the bracket and its corresponding assembly subsequently specified. A major portion of the working parts of the apparatus subject to adjustment and inspection or other operations during calibration, test, and service are rendered easily accessible by removal of cover 384. Suitable gaskets are placed between the contacting surfaces of the flange casting, base and cover. The vertical centerline of the assembly is substantially coincidental with the respective centerlines of the flange, base, and cover castings, each of which is substantially symmetrical in respect to its centerline.

Flange casting 380 is provided with a number of holes 390 through which screws may be inserted to fasten the flange casting to the engine. A spline 392 adapted to engage a corresponding driving mechanism in the engine is located at the lower end of the main drive shaft 58 which extends slightly below the flange casting and has its upper end approximately flush with the upper side of the flange casting. The drive shaft is keyed to a gear 394 in fluid pump 82 for operation of the pump, the shaft being guided by a pump housing 396 and a pump end cap 398. The only other principal member of the pump is a rotor 400. A gear 402 is keyed to the upper end of shaft 58 for rotating a gear 403 attached to the thermal piston 155 (see Fig. 7), gear 402 performing part of the function of the gearing 172 in Fig. 2. A drive shaft seal 404 and a seal plate 406 are included in the assembly for preventing leakage of fluid from the apparatus.

The base casting 382 is provided with a centrally located bearing 408 in which a shaft 410 operates as an extension of the main drive shaft 58. The lower end of shaft 410 is notched to provide a driving engagement with the toothed upper end of shaft 58 when base 382 is assembled to flange 380, as shown; but the base and flange may be separated without removal of either shaft from its corresponding casting assembly. A gear 412 is fixed to the lower end of shaft 410 and drives a gear train including gears 496, 314, and 414, as shown in Fig. 5. Gear 414 is fixed to a third gear 416 and both rotate freely on shaft 410. Gear 416 drives a gear 418 shown in Fig. 4.

Overspeed power piston 152 operates in a sleeve 420 retained in base 382 by a plate, the piston being biased downward by spring 265 in opposition to the pressure ($p_2$) in chamber 254 below the piston. Rod 212 extends upward from piston 152 to engage the governor lever 144.

Base 382 also houses bellows 136 the lower end of which is fixed to an apertured plate 424 assembled into the base in line with a passage 426 in flange casting 380 for supplying air at the compressor entrance air pressure ($p_E$) to the bellows interior. Passage 426 corresponds to conduit 54 of Fig. 1 and has its outer end threaded for the connection thereto of a suitable fluid pressure transmitting line.

The base casting 382 is provided with a number of studs 385 (see Fig. 6) over which bracket 383 is placed for assembly with the base by means of nuts 387 which are accessible on removal of cover 384. The bracket 383 supports all other elements of the apparatus except an adjusting sleeve 430 attached to the upper end of cover 384. The cover is removable from base casting 382 without disturbing adjustment of the apparatus and substantially all of the working elements are thereby rendered easily accessible for inspection, adjustment, parts replacement, and similar purposes.

Bellows 134 has a flanged fitting 432 at its upper end which is retained in the upper portion of bracket 383 and locked in place by means of a lock nut 434. Spring 274, support 270, nut 272, and cover 276 are provided as in Fig. 2, excepting that in the apparatus of Fig. 3, cover 276 is not accessible from the exterior of the completely assembled apparatus and therefore is not subject to tampering. A plug 436 is threadedly inserted in a collar 437 attached to the lower end of bellows 134. The spring 274 has its lower end hooked into an eye on the plug 436 and its upper end hooked into an eye formed on the lower end of support 270. The plug 436 has a hexagonal portion formed integrally with it so that it may be readily removed.

With this construction it is possible to change bellows springs quickly, if desired. The nut 272 is removed, and plug 436 is removed. The spring 274 and support 270 come out with the plug 436. The spring may then be changed and the device reassembled. A plug 438 at the upper end of bellows 136 is connected to plug 436 by means of a threaded rod 440, which may, as shown, be formed integrally with plug 436 and which corresponds to rod 268 of Fig. 2. An adjustable nut 442 is threaded onto connection 440 and locked in a desired position on the connection by means of a locknut 444. The barometric floating lever 128 has an opening 446 through which nut 442 is assembled on connection 440. The lever is provided with a pair of pins 448 which engage in nut 442 thereby causing the latter to serve as a fulcrum for the barometric floating lever.

The upper end of shaft 410 is fixed to a revolving plate 450 in the speed responsive device 224, which includes a pair of fly weights 452 and a casing 454. Operation of device 224 is the same in Fig. 3 as in Fig. 2, the device controlling the position of the governor valve sleeve 156 which operates in a ported guide 455 pressed into a portion of bracket 383. A governor valve 456 performs the function of valve 256 of Fig. 2, but differs from valve 256 in that instead of a pin-and-slot connection with governor lever 144, valve 456 is provided with a fulcrum 458. A light spring 460 is compressed between the upper end of valve 456 and a stop 462, for maintaining fulcrum 458 in engagement with governor lever 456. Stop 462 is threaded into the uppermost portion of bracket 383 and is used as a guide for retainer 236 and for limiting downward travel of setting lever 148. In this respect, stop 462 corresponds to adjusting screw 246 of Fig. 2. The upper end of adjusting sleeve 430 extends outside cover 384 and is rotatable therein; the sleeve is fastened by means of a lock nut 464 in a position corresponding to the desired vertical position of stop 462. The lower end of sleeve 430 is slotted for engagement with a pin 466 diametrically inserted in the upper end of stop 462, which moves vertically in response to rotation of the sleeve.

The interior of cover 384 and openings in base and flange castings 382 and 380 comprise the reservoir 74, as shown in Fig. 1. All gears, levers, pivots, bearings, and other working elements, not otherwise lubricated in the process of fluid pressure control, operate in a continuous oil bath. The reservoir is vented similarly to the reservoir of Fig. 2, and the apparatus may be operated as a closed system or be connected to the engine oil supply system as in Fig. 2.

*Figure 4*

Referring to the drawing, Fig. 4, there is shown another cross-sectional view of the apparatus of Fig. 2 substantially as built, corresponding to the view of Fig. 3 except for omission of the flange casting 380.

In base casting 382 is shown the main power piston 110 operable in a guide 468. A bearing 470 is assembled at the lower inside end of piston 110 for engaging the push rod 192. Rod 192 is connected to main floating lever 112 and the lever 472 which is pivoted on a pin 474 in bracket 383, corresponding to lever 194 and its pivotal connection with support 196, in Figure 2. The power piston 110 is rotated by gear 174 and the variable control oil pressure ($p_c$) is transmitted to the pump delivery varying means 46 of Fig. 1 from the chamber 190 below the piston.

Also assembled in base 382 are the main servo valve 108, main servo valve sleeve 109, and gear 418 which is driven by gear 416 of Fig. 3. Sleeve 109 rotates in a bushing 477 pressed into the base casting. Valve 108 has a pin-and-slot connection 476 with lever 112. Spring 218 is compressed between the upper end of valve 108 and a portion 220 of bracket 383. Adjusting screw 214 is fixed in lever 112 by means of lock nut 216, the lower end of screw 214 engaging a finger 366 on the manually operated push rod 114 of Fig. 2. Finger 210 is shown in contact with lever 112, the finger being operated by the rod 212 and overspeed power piston 152 of Figs. 2 and 3.

The barometric power piston 126 operates in a bushing 480 retained in base 382 by means of a plate 482 for sealing rod 282 which has a pivotal connection indicated at 484 with the barometric lever 128.

Elements of lever mechanism 132 are substantially as shown in Fig. 2, including barometric cam 130, fixed on pins 292 and 294, roller 290 and pin 288, positioning bar 286, circular bearing 208, pin 298, and lever 198. The upper end of spring 204 is hooked into the lower end of an adjusting screw 486 and its lower end is anchored in a pin 488 retained by the base casting 382. Screw 486 is slotted at 487 to receive a pin 489 carried by a pair of bearings 491 at the opposite sides of the end of lever 198. An adjusting nut 493 threaded on screw 486 serves to adjust the tension of spring 204. Nut 493 is held by a lock nut 495.

Cover 384 is fastened to the base casting 382 by means of a number of screws 490.

*Figure 5*

Referring to Fig. 5, there is shown another cross-sectional view of the apparatus of Figs. 3 and 4. The additional parts shown in Fig. 5 are as follows: barometric valve 124, barometric lever 128, barometric valve sleeve 125 rotatable in a bushing 492 retained in base 382, gears 312 and 314, and a shaft 494 for supporting gears 314 and 496, respectively.

There are also shown the control shaft 60 having a splined end for attaching a lever thereto, cams 116 and 150 adjacently fixed to shaft 60, push rod 114 operated by cam 116, a light spring 498 for maintaining rod 114 in contact with cam 116, finger 366, governor push rod assembly 146, and undercut portion 378 of push rod 238.

As previously explained in connection with Fig. 3, adjustable stop 462 is employed to limit the deflection of spring 234 at a maximum value; similarly, an adjusting screw 467 is provided to limit the deflection of the spring at a minimum value for idling. Another adjusting screw 469 is provided in the right-hand end of lever 148 for compensating tolerances in manufacture and assembly of the push rod assembly 146 and cam 150.

*Figure 6*

Referring to the drawing, Fig. 6, there is shown a section through the control apparatus of Figs. 3, 4 and 5, as indicated by section line 3—3 on Fig. 3. The principal purpose of Fig. 6 is to indicate locations of sections 3—3, 4—4, and 5—5 corresponding to Figs. 3, 4 and 5, respectively.

*Figures 7 and 8*

There is shown in these figures the thermal piston 155 and its related mechanism. Piston 155 is rotated by gear 403 attached to its lower end and driven by gear 402.

Gear 403 and piston 155 are supported by a combined thrust and radial bearing 500, which rests in a retainer 502 for the upper end of a spring 504, whose bottom end engages a suitable guide 506 in a recess in the flange casting 380. Spring 504 corresponds to spring 370 of Fig. 2.

Piston 155 rotates in a cup 508 which is retained in a recess in the base casting 382 by means of a suitable retainer plate 510. Cup 508 is provided with outlet ports 512 which communicate with the conduit 150 of Fig. 2, and with inlet ports 513 and 514 which communicate respectively with conduits 157 and 374 of Fig. 2. O rings 509 and 511 are provided in grooves on the external surface of cup 508 to prevent leakage between inlet and outlet ports. A thrust bearing 516 is provided between the piston 155 and the closed end of cup 508.

Push rod 364, which, as shown, may be formed integrally with piston 155, extends upwardly through base casting 382 and into engagement with an adjusting screw 518 carried by finger 366 and locked thereto by a lock nut 520. Finger 366 is carried by rod 114, which extends upwardly through a port of bracket 383 (see Fig. 5).

When cover 384 is removed, adjusting screw 518 and lock nut 520 are both readily accessible from the side for adjustment purposes.

The terms and expressions used herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

1. Speed control apparatus for a turbojet engine having a fuel pump with means, responsive to a fluid control pressure, for varying its delivery of fuel to said engine, comprising: a source of control fluid and conduit means for the flow of said fluid from said source to said delivery varying means; a valve guide in said conduit means and a valve operable therein for regulating said control pressure in a portion of said conduit means continuously connected to said valve guide, said valve having a neutral position wherein said regulated pressure has a substantially constant value and being effective when displaced in opposite directions from said neutral position to produce opposite changes in the value of said regulated pressure; a cylinder communicating with said portion of said conduit means and a piston operable in said cylinder; loading means connected to said piston, including means for applying to said piston a force which varies with the speed of said engine, for controlling the position of said piston in accordance with a selected function of said regulated pressure; means for varying said regulated pressure in accordance with the movement of said piston, means for applying said regulated pressure directly to said delivery varying means, whereby said delivery varying means is actuated directly by said regulated pressure; a connection between said valve and said piston for controlling the position of said valve as a function of the position of said piston, said piston being effective when said valve is displaced from said neutral position to operate said connection in a sense to restore said valve to said neutral position; and driving means for producing proportionate rotary motion of said valve and said piston to prevent sticking of said valve in its guide and said piston in its cylinder.

2. Speed control apparatus for a turbojet engine as set forth in claim 1, including manual control means, connected to said loading means, for displacing said valve from said neutral position to selectively vary said selected function, whereby said regulated pressure and hence the position of said piston are selectively varied by operation of said manual control means.

3. Speed control apparatus for a turbojet engine as set forth in claim 2, including means, controlled by said manual means, for modifying said loading force to modify said selected function, whereby said regulated pressure and hence the position of said piston are selectively varied by the operation of said modifying means.

4. Fuel control apparatus for an internal combustion engine having a pump associated therewith for the flow of fuel thereto, said pump having delivery varying means connected thereto, comprising: a source of hydraulic fluid at superatmospheric pressure, conduit means for the flow of fluid from said source to said delivery varying means, a valve guide and a valve slidable and rotatable therein for varying a control pressure in a portion of said conduit means, said valve having a neutral position wherein said control pressure is substantially constant and being effective when moved in opposite directions from said neutral position to produce opposite changes in the value of said control pressure, said delivery varying means being actuated by the direct application thereto of said control pressure; first and second levers movable on first and second fixed pivots respectively, a connection between said levers for transmitting the movement of each of said levers at said connection to the other of said levers, a spring having one end fixed and its other end engaged with said first lever for opposing movement thereof by said second lever, means responsive to said control pressure for operating said second lever to transmit a first force proportional to said control pressure to said connection in opposition to a second force proportional to the load on said spring, means connecting said valve to said pressure responsive means for concurrent movement therewith, said pressure responsive means being movable to maintain said first and second forces in equilibrium and being effective when said valve deviates from said neutral position to operate said connecting means in a sense to restore said valve to said neutral position; and rotating means for producing relative rotary motion between said valve and said guide to prevent sticking of said valve, whereby said control pressure has a value proportional to said load on said spring and whereby said fuel flow is a function of said spring load and said two force proportionalities.

5. Control apparatus as set forth in claim 4, wherein said pressure responsive means includes a piston guide and a piston responsive to said control pressure slidable in said piston guide, and including means connected to said rotating means for proportioned rotary motion between said piston and said valve to prevent sticking of said piston in its guide.

6. Control apparatus as set forth in claim 4, including a second valve guide and a second valve slidable and rotatable therein for controlling a second pressure in a second portion of said conduit means, operating means responsive to said second pressure for varying the position of said connection to modify said two force proportionalities, and means connected to said rotating means for producing proportional rotary motion between said first and second valve to prevent sticking of said second valve in its guide, whereby said fuel flow is varied by operation of said second valve.

7. Control apparatus as set forth in claim 6, wherein said operating means includes positioning means responsive to said pressure in said second portion of said conduit means for controlling said connection, a cam separate from said levers, and spring means for guiding a portion of said positioning means on a contoured portion of said cam to control the movement of said connection as a function of said contour.

8. Control apparatus as set forth in claim 4, including a second valve guide and a second valve slidable therein for controlling respectively second and third pressures in second and third portions of said conduit means, means for producing a fourth pressure as a predetermined function of said third pressure in respect to time, operating means responsive to the differential between said second and said fourth pressures for varying the position of said connection to vary said two force proportionalities, a cam separate from said levers for modifying the movement of said connection by said operating means as a function of the contour of said cam, and means connected to said rotating means for proportioned rotary motion between said first and second valves to prevent sticking of said second valve in its guide, whereby said fuel flow is varied by operation of said second valve.

9. Control apparatus as set forth in claim 4, including operating means, controlled by a manual means, for varying the position of said connection to modify said two force proportionalities, a piston guide in said pressure responsive means and a piston responsive to said control pressure and slidable in said piston guide, a second manually operated means for displacing said valve from said neutral position to vary the position of said pressure responsive means corresponding to said neutral position, thermal control means responsive to a temperature in said engine for overriding both of said manually operated means in a sense to decrease said control pressure when a predetermined value of temperature is exceeded, means for varying said predetermined value of said temperature, and means connected to said rotating means for producing relative rotary motion between said piston and said piston guide to prevent sticking of said piston, whereby said control pressure is varied by said operating means and both of said manually operated means.

10. Control apparatus as set forth in claim 9, including a drive shaft operated at a speed proportional to the speed of said engine, governor means responsive to said shaft speed for overriding said second manually operated means to operate said valve in a sense to decrease said fuel flow when a predetermined value of engine speed is exceeded, and wherein said rotating means is operated by said drive shaft.

11. Control apparatus as set forth in claim 4, including a second valve guide and a second valve slidable therein for controlling second and third pressures respectively in corresponding second and third portions of said conduit means, means for operating said second valve in response to an operating pressure in said engine, a conduit connected to said third portion of said conduit means for the flow of fluid therefrom, a restriction in said conduit, operating means responsive to the differential between said second pressure and the pressure downstream from said restriction for varying the position of said first connection to vary said two force proportionalities, manually operated means for displacing said control pressure varying valve from said neutral position to vary the position of said pressure responsive means corresponding to said neutral position, and means connected to said rotating means for producing relative rotary motion between said second valve and said second valve guide, whereby said fuel flow varies as a function of the position of said manually operated means and said engine operating pressure.

12. Control apparatus as set forth in claim 11, wherein said restriction is effective to control the rate of change of said pressure differential when said engine operating pressure increases, and including means for changing said pressure differential at a relatively faster rate when said engine operating pressure decreases.

13. Fuel control apparatus for an internal combustion engine having associated therewith a pump for delivering fuel thereto and means for varying said delivery, comprising: a source of hydraulic fluid at substantially constant superatmospheric pressure, first and second conduit means for the flow of fluid from said source, a first valve in said first conduit means for controlling the flow therethrough to regulate the pressure in a portion thereof, said delivery varying means being actuated by said regulated pressure, control means for operating said first valve, restricting means in said second conduit means for establishing a pressure differential thereacross, a second valve in said second conduit means downstream from said restricting means, said second valve being responsive to a temperature in said engine and effective to vary said differential and hence the pressure downstream from said restricting means as a predetermined function of said temperature, a piston responsive to said downstream pressure for overriding said control means in a sense to reduce said fuel flow when the value of said downstream pressure falls below a pre-established value corresponding to a predetermined value of said temperature, and means for varying the relationship between said temperature and said pre-established value, whereby said fuel flow varies as a function of the position of said control means and said temperature when the latter exceeds said predetermined value.

14. Fuel control apparatus for an internal combustion engine having associated therewith a pump for delivering fuel thereto and means for varying said delivery, comprising: a source of hydraulic fluid at superatmospheric pressure, conduit means for the flow of fluid from said source, control means for controlling a pressure in a portion of said conduit means, said delivery varying means being actuated by said controlled pressure, a piston guide having a pair of ports therein, first and second conduits connecting said ports to said source, a piston slidable in said piston guide and means for rotating said piston, said piston having a chamber at one end thereof and being slotted so that it is effective when rotated to intermittently afford passage for flow from said ports corresponding to said first and second conduits to said chamber, a third conduit for flow of fluid from said chamber, and a valve in said third conduit responsive to a temperature in said engine; said valve being normally closed and effective when a predetermined value of said temperature is exceeded to permit flow from said first and second conduits through said ports, said chamber, and said third conduit past said valve and to thereby vary the pressure in said chamber as a function of said temperature; said piston being responsive to said chamber pressure and effective when said chamber pressure falls below a pre-established value corresponding to a pre-selected value of said temperature to override said control means in a sense to reduce said fuel flow, whereby said fuel flow varies as a function of the operation of said first control means and said temperature when the latter exceeds said predetermined value.

15. Control means as set forth in claim 14, including means for cutting off the flow in said second conduit to decrease said chamber pressure value corresponding to said preselected value of said temperature below said pre-established value, so that said pre-established pressure is not reached until said temperature reaches a second value higher than said preselected value.

16. Fuel control apparatus for an internal combustion engine having associated therewith a pump for delivering fuel thereto and means for varying said delivery, comprising: a source of hydraulic fluid, a fluid pump having the inlet thereof connected to said source and means for maintaining a substantially constant superatmospheric pressure at the outlet of said fluid pump, conduit means for the flow of fluid from said pump to said delivery varying means, control means connected in series with said conduit means for controlling a pressure in a portion of said conduit means, means for actuating said delivery varying means by the direct application thereto of said controlled pressure and effective to increase said fuel flow as said controlled pressure increases, first means responsive to a temperature in said engine and effective only when a predetermined value of said temperature is exceeded to override said control means so as to reduce said controlled pressure and hence said fuel flow, and second means for varying the response of said first means to said predetermined value of said temperature.

17. Fuel control apparatus for an internal combustion engine having associated therewith a pump for delivering fuel thereto and means for varying said delivery, comprising: a source of hydraulic fluid at superatmospheric pressure, conduit means for the flow of fluid from said source to said delivery varying means, control means connected in series with said conduit means for controlling a pressure in a portion of said conduit means, means for actuating said delivery varying means by the direct application thereto of said controlled pressure, a device responsive to the engine speed, governor means, controlled by a manual control and responsive to said device, for operating said pressure control means in a sense to reduce said fuel flow when a predetermined value of said speed as determined by said manual control is exceeded, and adjustable stop means for limiting the movement of said varying means to determine the maximum speed value.

18. Control apparatus as set forth in claim 17, including a spring opposing motion of said speed responsive device in response to an increase in speed, a cam, means for operating said cam, a follower operated by said cam, means for varying said deflection of said spring, a motion-transmitting connection between said follower and said deflection varying means, a stop for limiting motion of said deflection varying means in a speed increasing sense to determine the maximum value of said speed, and means in said connection for permitting relative motion between said follower and said deflection varying means when said cam operates said follower so as to move said deflection varying means against said stop, whereby movement of said cam operating means is not affected by said stop.

19. Fuel control apparatus for an internal combustion engine having associated therewith a pump for delivering fuel thereto and means for varying said delivery, comprising: a source of hydraulic fluid, a fluid pump having the inlet thereof connected to said source, conduit means for the flow of fluid from the outlet of said pump, a first valve for controlling a first pressure in a first portion of said conduit means, said delivery varying means being actuated by said first pressure, movable means for operating said first valve to vary said first pressure, a piston responsive to said first pressure and spring means for applying a force on said piston in opposition to said first pressure, a connection between said piston and said first valve to maintain the value of said first pressure proportional to said force, said valve, piston and connection cooperating to maintain a predetermined relationship between said first pressure and the position of said movable means, a second valve for controlling second and third pressures in second and third portions of said conduit means, respectively, means responsive to the differential between said second and third pressures for varying said force to vary said predetermined relationship, a cam in said differential responsive means for determining the functional relationship between said differential and said force, guides for each of said valves and said piston and a shaft driven by said engine for simultaneously operating said fluid pump and producing relative rotation between said valves, said piston and their respective guides to prevent sticking of said valves and said piston, whereby said fuel flow is varied by operation of said first means and said second value.

20. Control apparatus as set forth in claim 19, including means responsive to a temperature in said engine and effective when a predetermined value of said temperature is exceeded to override said first means in a sense to reduce said fuel flow, and means responsive to said movable means and effective within a preselected range of operation of said movable means to vary said predetermined value of said temperature.

21. Control apparatus as set forth in claim 19, including means responsive to the speed of said engine for overriding said movable means in a sense to reduce said fuel flow when a predetermined value of said speed is exceeded, a control shaft for operating said movable means, means operable by said control shaft for varying said predetermined value of speed, and means for rendering said speed varying means ineffective to increase said speed above a pre-established value.

22. Fuel control apparatus for an internal combustion engine having associated therewith a pump for delivering fuel thereto and means for varying said delivery, comprising: a source of hydraulic fluid, a fluid pump having the inlet thereof connected to said source, conduit means for the flow of fluid from the outlet of said pump, first control means and loading means for applying a force thereto, said first control means being effective to control a first pressure in a first portion of said conduit means, said delivery varying means being responsive to said first pressure, second control means for modifying said first pressure; said second control means comprising a pilot valve for controlling second and third pressures respectively in second and third portions of said conduit means, means responsive to a pressure in said engine for operating said pilot valve to oppositely vary said second and said third pressures, a piston having first and second expansible chambers at the opposite ends thereof, said piston being responsive to the differential between the respective pressures in said chambers, and effective to vary said force to modify said first pressure as a function of the position of said piston, first and second conduits for flowing fluid between said third portion of said conduit means and said second chamber, a third conduit for transmitting said second pressure to said first chamber, a restriction in said first conduit for controlling the flow therethrough, a check valve in said second conduit for preventing flow from said third portion to said second chamber, a connection responsive to said piston for positioning said pilot valve, said connection being effective when said engine pressure responsive means is stationary to operate said pilot valve to shut-off position and to maintain a predetermined relationship between the position of said piston and the value of said engine pressure, said restriction being effective to control the rate of change of said piston position as said engine pressure varies in a sense to increase said third pressure, said check-valve being effective to render said restriction ineffective to control the rate of change of said piston position as said engine pressure varies in a sense to decrease said third pressure.

23. Control apparatus for an internal combustion engine, comprising means for controlling the supply of fuel to said engine, engine speed responsive means for continuously operating said fuel supply controlling means to maintain said engine speed at a substantially constant value, means responsive to a temperature in said engine for operating said fuel supply controlling means to reduce the fuel supply when said temperature exceeds a predetermined value, manually operable adjusting means for controlling said speed responsive means to vary said substantially constant speed value, means operatively connected with said adjusting means and operable when said substantially constant speed is set at a predetermined value to increase the temperature value at which said temperature responsive means becomes effective to reduce said fuel supply.

24. Control apparatus for an internal combustion engine, comprising means for controlling the supply of fuel to said engine in response to a variable control fluid pressure, and means for controlling said variable pressure including a barometric control system, a speed responsive control system, and a main control system, each of said systems comprising a valve guide, a valve translatable and rotatable in said guide, a cylinder, a piston translatable and rotatable in said cylinder, and means for subjecting at least one end of said piston to a pressure controlled by its associated valve, a base casting, a mounting casting for connecting said base casting to said engine, a shaft driven by said engine and extending into said mounting casting, said base casting having parallel bores therein for receiving said cylinders and at least one of said valve guides, and gearing means driven by said shaft for continuously rotating all said valves and at least one of said pistons at proportioned rotary speeds.

25. Control apparatus as set forth in claim 24, including pressure responsive means in said barometric control system for operating the valve therein, speed responsive means in said speed responsive control system for operating the valve therein, manually operable means in said main control system for operating the valve therein, and a bracket mounted on the face of said base casting opposite said mounting casting and supporting said pressure responsive means, said speed responsive means and said manually operable means.

26. Control apparatus as set forth in claim 25, including adjusting means for said pressure responsive means, adjusting means for said speed responsive means, adjusting means for said manually operable means, all said adjusting means being mounted on said bracket, and a cover attached to said base casting and enclosing all the parts mounted on said bracket, so that all said adjusting means are accessible upon removal of said cover.

27. Control apparatus as set forth in claim 26, including a first coupling on one of said adjusting means extending toward said cover, a control element adjustably mounted in said cover and extending both inwardly and outwardly therefrom, a second coupling on the inner end of said element and adapted to mate with said first coupling, and means on the outer end of said element for adjusting it.

28. Control apparatus as set forth in claim 24, including a manually operable control shaft extending into said base casting, and means on said shaft within said casting for controlling said speed responsive system and said main system.

29. Control apparatus as set forth in claim 24, including a speed responsive device in said speed responsive control system, an extension shaft operated by said engine driven shaft for driving said speed responsive device, said extension shaft being mounted in said base casting and removable therewith from said mounting casting, said bracket, and said cover.

30. Control apparatus, comprising a supporting casting, a drive shaft extending through said casting, a base casting supported by said supporting casting, cooperating valve and seat elements in said base casting rotatable and slidable relative to each other, cooperating piston and cylinder elements in said base casting rotatable and slidable relative to each other, means connecting one of each set of cooperating elements to said drive shaft to produce proportioned relative rotation thereof, fluid connections between said valve and seat elements whereby said valve controls a fluid pressure on at least one end of said piston, means mounted on said base casting for positioning said valve, a load device mounted on said base casting and connected to said piston to be positioned thereby, and a cover for said base casting enclosing said positioning means and said load device.

31. Control apparatus as in claim 30, including a pump in said supporting casting driven by said shaft, a fluid connection between the outlet of said pump and said valve, a fluid connection between said valve and the space inside said cover which constitutes a reservoir, said valve being effective to control said pressure by selectively connecting said one piston end to said pump outlet or to said reservoir, and a drain connection between said reservoir and the inlet of said pump.

32. Fuel control apparatus for an internal combustion engine having associated therewith a pump for delivering fuel thereto and means for varying said delivery, comprising: a source of hydraulic fluid at superatmospheric pressure, conduit means for the flow of fluid from said source, control means in said conduit means for controlling a pressure in a portion of said conduit means, said delivery varying means being actuated by said controlled pressure, a device responsive to the engine speed, governor means responsive to said device for operating said control means in a sense to reduce said fuel flow when a predetermined value of said speed is exceeded, means for varying said predetermined value of speed, and adjustable stop means for limiting the movement of said varying means to determine the maximum speed value; manual means for operating said control means, means responsive to a temperature in said engine and effective when a predetermined temperature is exceeded to override said control means in a sense to reduce said fuel flow, and means operated by said manual means for varying said predetermined temperature.

References Cited in the file of this patent

UNITED STATES PATENTS

| Number | Name | Date |
| --- | --- | --- |
| 1,411,991 | Doran | Apr. 4, 1922 |
| 1,549,745 | Church | Aug. 18, 1925 |
| 2,013,372 | Work | Sept. 3, 1935 |
| 2,016,234 | Hughes | Oct. 1, 1935 |
| 2,106,684 | Ring | Jan. 25, 1938 |
| 2,117,891 | Kalin | May 17, 1938 |
| 2,196,279 | Thomas | Apr. 9, 1940 |
| 2,229,681 | Sorensen | Jan. 28, 1941 |
| 2,245,562 | Becker | June 17, 1941 |
| 2,258,094 | Keller | Oct. 7, 1941 |
| 2,264,262 | Erbguth | Nov. 25, 1941 |
| 2,274,254 | Newton | Feb. 24, 1942 |
| 2,313,002 | Menesson | Mar. 2, 1943 |
| 2,336,232 | Doran | Dec. 7, 1943 |
| 2,384,282 | Chandler | Sept. 4, 1945 |
| 2,404,428 | Bradbury | July 23, 1946 |
| 2,405,888 | Holley | Aug. 13, 1946 |
| 2,410,474 | Zeigler | Nov. 5, 1946 |
| 2,452,088 | Whitehead | Oct. 26, 1948 |
| 2,456,211 | Nardone | Dec. 14, 1948 |
| 2,622,393 | Edwards | Dec. 13, 1952 |

FOREIGN PATENTS

| Number | Country | Date |
| --- | --- | --- |
| 42,494 | France | May 8, 1933 |
| | (Addition to No. 724,287) | |